United States Patent
Espinasse et al.

(10) Patent No.: US 10,018,292 B2
(45) Date of Patent: Jul. 10, 2018

(54) END FITTING FOR CONNECTING A FLEXIBLE PIPE FOR TRANSPORTING A CRYOGENIC FLUID

(75) Inventors: Philippe Espinasse, Bihorel (FR); Jean-Michel Gerez, Paris (FR); Olivier Leclerc, Norville (FR); Pascal Prevost, Villequier (FR)

(73) Assignee: TECHNIP FRANCE (FR)

( * ) Notice: Subject to any disclaimer, the term of this patent is extended or adjusted under 35 U.S.C. 154(b) by 933 days.

(21) Appl. No.: 13/816,707

(22) PCT Filed: Aug. 11, 2011

(86) PCT No.: PCT/FR2011/051906
§ 371 (c)(1),
(2), (4) Date: May 30, 2013

(87) PCT Pub. No.: WO2012/022908
PCT Pub. Date: Feb. 23, 2012

(65) Prior Publication Data
US 2013/0241197 A1    Sep. 19, 2013

(30) Foreign Application Priority Data

Aug. 16, 2010 (FR) .................. 10 56612

(51) Int. Cl.
| | |
|---|---|
| *F16L 33/01* | (2006.01) |
| *F16L 59/14* | (2006.01) |
| *F16L 59/153* | (2006.01) |
| *F16L 59/18* | (2006.01) |

(52) U.S. Cl.
CPC ............ *F16L 33/01* (2013.01); *F16L 59/141* (2013.01); *F16L 59/153* (2013.01); *F16L 59/187* (2013.01)

(58) Field of Classification Search
CPC ....... F16L 33/01; F16L 59/153; F16L 59/187; F16L 59/141
See application file for complete search history.

(56) References Cited

U.S. PATENT DOCUMENTS

| | | | | |
|---|---|---|---|---|
| 6,161,880 | A | * 12/2000 | Peppel | .................... F16L 33/01 285/104 |
| 2003/0217779 | A1 | 11/2003 | Schippl | ......................... 138/148 |
| 2007/0164246 | A1 | 7/2007 | Lange et al. | .................. 251/142 |

(Continued)

FOREIGN PATENT DOCUMENTS

| | | |
|---|---|---|
| EP | 2 230 432 A2 | 9/2010 |
| GB | 2 070 725 A | 9/1981 |

(Continued)

OTHER PUBLICATIONS

P.J.C. Cox et al. "Cryogenic Flexible for Offshore LNG Transfer", Offshore Technology Conference 15400 (2003) pp. 1-6.

(Continued)

*Primary Examiner* — David Bochna
*Assistant Examiner* — James A Linford
(74) *Attorney, Agent, or Firm* — Ostrolenk Faber LLP

(57) ABSTRACT

The disclosure relates to an end fitting (40) for connecting a flexible pipe for transporting a cryogenic fluid, comprising thermal insulation means (65) interposed between the cold part (41) of the connecting end fitting and the rear part (51) for crimping the end of a leak proof sealed external sheath (9) of said flexible pipe.

3 Claims, 3 Drawing Sheets

(56) References Cited

U.S. PATENT DOCUMENTS

| | | | | |
|---|---|---|---|---|
| 2009/0223586 A1* | 9/2009 | Vo | ............................ | F16L 11/08 |
| | | | | 138/120 |
| 2009/0322077 A1* | 12/2009 | Eccleston | ................ | F16L 33/01 |
| | | | | 285/337 |
| 2010/0025985 A1* | 2/2010 | De Aquino | .............. | F16L 33/01 |
| | | | | 285/222.2 |
| 2010/0230952 A1* | 9/2010 | Ong | ....................... | F16L 11/082 |
| | | | | 285/102 |

FOREIGN PATENT DOCUMENTS

| | | |
|---|---|---|
| WO | WO 01/96772 A1 | 12/2001 |
| WO | WO 2006/132532 A2 | 12/2006 |
| WO | WO 2008/037867 A1 | 4/2008 |
| WO | WO 2008/071637 A2 | 6/2008 |
| WO | WO 2009/127650 A1 | 10/2009 |

OTHER PUBLICATIONS

International Search Report dated Oct. 20, 2011 issued in corresponding international patent application No. PCT/FR2011/051906.

\* cited by examiner

US 10,018,292 B2

END FITTING FOR CONNECTING A FLEXIBLE PIPE FOR TRANSPORTING A CRYOGENIC FLUID

CROSS REFERENCE TO RELATED APPLICATIONS

The present application is a 35 U.S.C. § 371 National Phase conversion of PCT/FR2011/051906, filed Aug. 11, 2011, which claims benefit of French Application No. 10 56612, filed Aug. 16, 2010, the disclosures of which are incorporated herein by reference. The PCT International Application was published in the French language.

TECHNICAL FIELD

The present invention relates to an end fitting for connecting a flexible pipe for transporting a cryogenic fluid.

A cryogenic fluid derived, for example from a method for liquefying gas is for example liquefied natural gas having a boiling point that is lower than −160° C.

BACKGROUND OF THE INVENTION

The transport of this type of fluid, in particular from a liquefaction unit to a transport vessel or from a transport vessel to a storage unit, is generally carried out by means of a flexible fluid transporting pipe having an internal diameter of the order of 400 mm in a manner so as to ensure a high throughput and rapid transfer.

Flexible pipes used for these operations in an off-shore environment are most often classified into two categories, aerial flexible pipes, and floating or underwater flexible pipes.

In the case of a side by side type transfer configuration in which the boat is brought alongside a quay or a floating unit, the aerial flexible pipe has a length of around 40 to 70 meters. In the case of a tandem configuration in which the vessel is brought to the stern or bow of the floating unit, the vessel and the floating unit being substantially aligned, the aerial flexible pipe has a length of around 100 to 170 meters. The side by side configuration requires a flexible pipe that is stronger than that in the other configuration.

For a transfer between a ship and a floating unit, by means of a floating or underwater flexible pipe, the flexible pipe has a length which can go up to approximately 350 meters. These floating or underwater pipes are generally pipes that are used in the harshest of conditions on account of a lower bending radius and being subjected to a higher dynamic load due in particular to the movement of floating supports as well as to the leak proof sealing that is more difficult to control with respect to the external environment given that the flexible pipe may be submerged.

In a general manner, the flexible pipe comprises of several layers from the inside to the outside, namely:
- a corrugated inner tube, defining a plurality of corrugations leading radially towards the axis,
- at least one tensile armour layer, arranged around the corrugated tube,
- at least one thermal insulation layer arranged around the armour layer, and
- a leak proof sealed external sheath.

The flexible pipe may also include an leak proof sealed intermediate sheath fabricated by means of winding and bonding of rubber strips, or by extrusion of a polymeric material, and disposed between two layers of thermal insulation.

The leak proof sealed external sheath is fabricated by means of winding and bonding of rubber strips, or with two polymeric tubular sheaths extruded one over the other.

The flexible pipes also have connecting end fittings intended for connecting them to one another or with the terminal equipment and these end fittings must be manufactured under conditions that ensure both optimal fastening as well as good leak proof sealing.

Indeed, the connecting end fittings must perform several functions that include fixing of the end of the corrugated tube, anchoring of the tensile armour as well as thermal protection of the external sheath and the means for crimping this external sheath.

For this purpose, the connecting end fittings comprise a front part including an array of elements, and in particular a front end flange for holding in place the corrugated tube and elements for fixing the armour layer. The connecting end fittings also comprise a rear part formed by at least one rear end flange for crimping the external sheath and for holding in place the thermal insulation layers. The front end and rear end flanges, respectively, are connected to each other by connecting elements in a manner so as to ensure cohesion between the front and rear parts of the connecting end fitting.

The external sheath is generally comprised of polymers that become brittle at low temperatures, and in practice should not be subjected to temperatures below −20° C.

In the main part of the flexible pipe, that is to say, between the two ends, the thermal insulation layers make it possible to ensure that the cryogenic fluid which is at a temperature of about −160° C., is prevented from excessively cooling the external sheath.

However, the thermal insulation layers are terminated at the level of each end fitting, which could eventually cause a rupture of the thermal bridge at the crimping area of the external sheath and thus excessively cool the end of the external sheath.

The invention aims to provide a connecting end fitting for a flexible pipe which makes it possible to avoid this type of problem by means that are simple to implement.

SUMMARY OF THE INVENTION

The invention therefore relates to an end fitting for connecting a flexible pipe for transporting a cryogenic fluid comprising a corrugated inner tube, at least one tensile armour layer, arranged around the corrugated tube, at least one thermal insulation layer arranged around the armour layer and one leak proof sealed external sheath disposed around the thermal insulation layer, the said end fitting comprising a front part comprising, on the one hand, a front end flange for holding in place the corrugated tube and, on the other hand, elements for fixing the armour layer, and a rear part comprising at least one rear end flange for crimping the external sheath and for holding in place the thermal insulation layer, the front end and rear end flanges, respectively, being connected to each other by connecting elements, characterised in that it comprises thermal insulation means interposed between the front end and rear end flanges, respectively, in order to isolate the rear part from the front part of the end fitting.

According to other characteristic features of the invention:
- the thermal insulation means comprise an annular block made of insulating material comprising an axial orifice for the passage of the armour layer and the corrugated tube, the connecting elements comprise front connecting elements connecting the front end flange to the annular block and rear connecting elements connecting the said at least rear end flange to the annular block, the front and rear connecting elements, respectively, are connected to each other by metal tie rods passing through said annular block through bores and distributed around the flexible pipe, the tie rods are prestressed in tension, the insulating material of the annular block is a composite material comprising glass or ceramic, and the end of said at least one thermal insulation layer extends below the rear end flange up to the annular block.

The invention will be better understood upon reading the description following here below provided purely by way of example and prepared by making reference to the accompanying drawings, in which:

DESCRIPTION OF PREFERRED EMBODIMENTS

Figure 1:
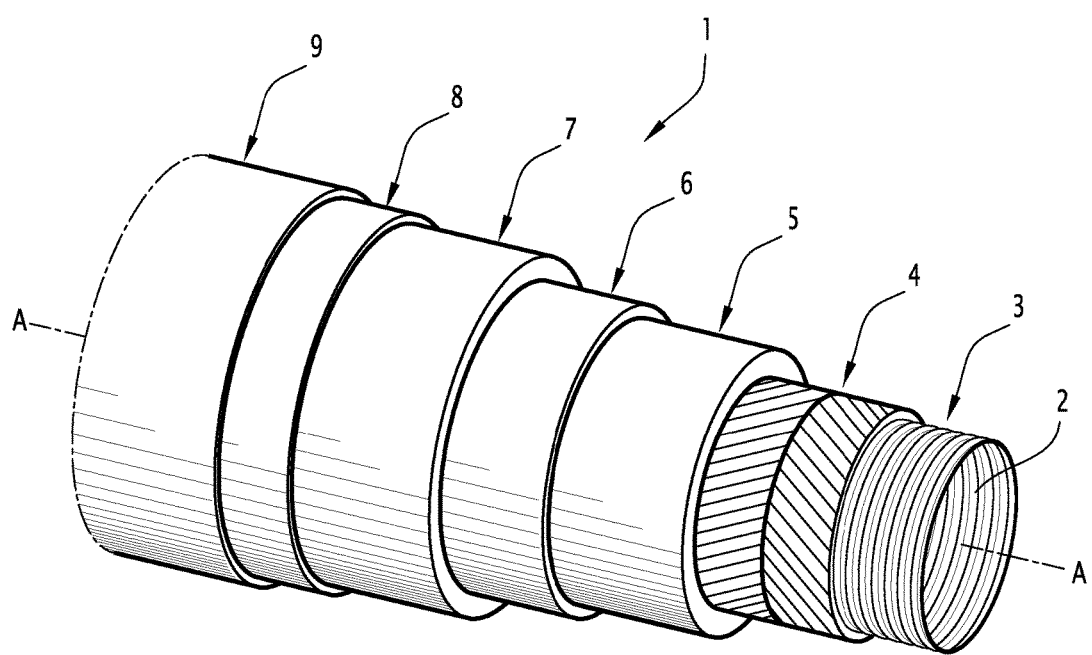
FIG. 1 is a partial view in perspective of a flexible pipe for transporting a cryogenic fluid

In FIG. 1, a partial representation is provided of a flexible pipe 1 intended for transporting a cryogenic fluid such as a liquefied gas, from a liquefaction unit to a transport vessel or from a transport vessel to a storage unit. The pipe 1 has for example a length greater than 30 meters and in particular between 30 and 350 meters. It delimits a central passage 2 for the circulation of cryogenic fluid with axis AA.

By way of example, the flexible pipe 1 comprises from the inside to the outside:

a corrugated inner tube 3, which is suitable for ensuring leak proof sealing for the fluid and resistance to internal pressure, at least one tensile armour layer 4 made of wound polyester fibres or austenitic stainless steel, suitable to withstand the axial loads involved with respect to the pipe 1, one layer 5 made of tightly wound polyester fibres having the function of maintaining in place the tensile armour and additional thermal insulation, a first array of thermal insulation layers 6, a leak proof sealed intermediate sheath 7, a second array of thermal insulation layers 8, and a leak proof sealed external sheath 9 fabricated by means of winding and bonding of rubber strips or with two polymeric tubular sheaths extruded one over the other.

The flexible pipe 1 includes at each of its ends, a connecting end fitting intended for connecting several sections of flexible pipes to each other and also intended for connecting the flexible pipe with terminal equipment. These end fittings must be manufactured under conditions that ensure both optimal fastening as well as good leak proof sealing.

Figure 2:
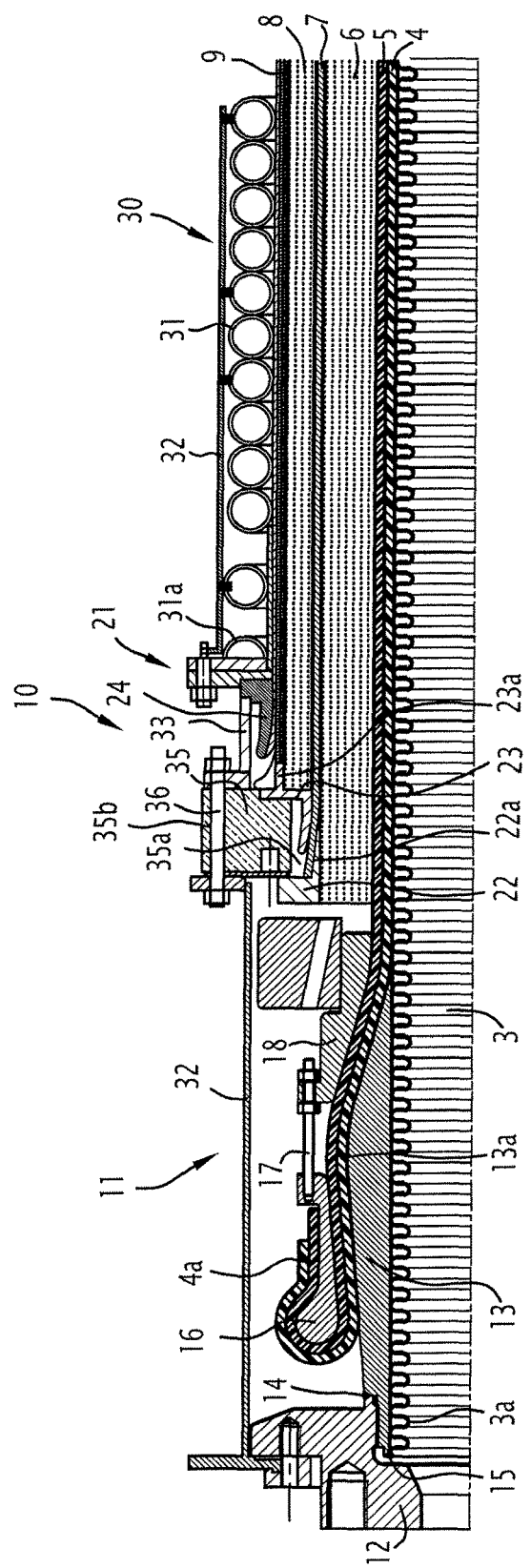
FIG. 2 is a partial schematic half view and axial cross sectional representation of a first embodiment of a connecting end fitting, in accordance with the invention.
Figure 3:
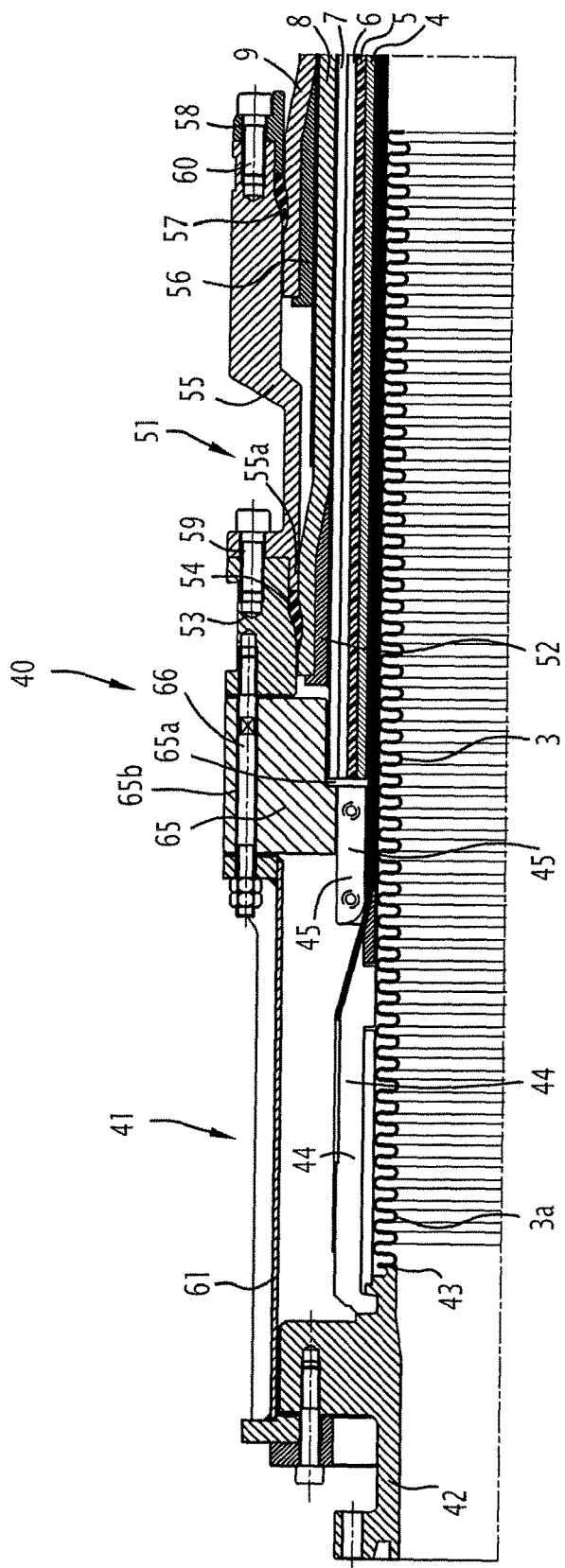
FIG. 3 is a partial schematic half view and axial cross sectional representation of a second embodiment of a connecting end fitting, in accordance with the invention.

FIGS. 2 and 3 show a representation of two embodiments of two connecting end fittings, respectively designated by the reference numerals 10 and 40.

In these figures, only the elements of the end fittings 10 and 40 that are related to the invention have been shown, the other elements of which each of these connecting end fittings is comprised have been removed in order to facilitate understanding thereof.

The various layers 3 to 9 of which the flexible pipe 1 is composed have been represented in an axial cross sectional view.

According to the first embodiment represented in FIG. 2, the connecting end fitting 10 is composed of a front part 11 and a rear part 21.

The front part 11 of the connecting end fitting 10 comprises of an end flange 12 that is integrally joined to the free end 3a of the corrugated pipe 3 by means of a metal ring 13. This metal ring 13 is connected to the front end flange 12 by means of a first leak proof sealed weld bead 14 and to the free end 3a of the corrugated pipe 3 by means of a second leak proof sealed weld bead 15.

In the embodiment represented in FIG. 2, the tensile armouring of the armour layer 4 is made of polyester fibres and the anchoring of the armour is done using the capstan effect.

For this purpose, the ring 13 has on its external face, an annular boss 13a and the ends 4a of the armour are fixed to the ring 13 by an anchor block 16 inserted over the ring 13 and on which said free ends 4a of the armour are folded back. The anchor block 16 is connected by tie rods 17 to a clamping cone 18 that is also inserted onto the armouring of the armour layer 4. The combination of the anchor block 16 and the clamping cone 18 connected by the tie rods 17 makes it possible to wedge the armouring of the armour layer 4 over the boss 13a of the ring 13.

The rear part 21 comprises at least one rear end flange for crimping the external sheath 9 and for holding said at least one thermal insulation layer 6 and 8.

In the embodiment represented in FIG. 2, the rear part 21 comprises a first flange 22 for holding in place the thermal insulation layer 6 and for attachment of the leak proof sealed intermediate sheath 7. The leak proof sealed intermediate sheath 7 overlaps an extension 22a of the flange 22 and is held over this extension 22a by a collar 23 inserted over said extension 22a in a manner so as to hold fast by wedging the end of the leak proof sealed intermediate sheath 7.

The end of the thermal insulation layer 8 is in abutment against the collar 23 which has an extension 23a below which extends the end of the thermal insulation layer 8. The end 9 of the external sheath extends over the extension 23a of the collar 23 and is held over said extension 23a by a flange 24 for crimping said external sheath 9.

The end of the flexible pipe 1 includes before the connecting end fitting 10, a bend restrictor 30 of known type. This bend restrictor 30 is formed by tubes 31 wound around the external sheath 9 of which some are integrally secured to the flexible pipe 1, on the one hand, and others are connected to each other by rods 32 integrally secured to the rear end flange 24. The restrictor 30 comprises of an end half-tube 31a integrally secured to the flexible pipe 1, on the one hand, and to the rear end flange 24 on the other.

In order to ensure cohesion between the front 11 and rear 21 parts, respectively, these parts are connected to each other by connecting elements which are described below.

Due to the circulation of the cryogenic fluid within the flexible pipe 1, the front part 11 of the connecting end fitting 10 is subjected to cold temperatures given that the thermal insulation layers 6 and 8 are terminated before the said front part 11.

In order to prevent the cold front part 11 from cooling the rear part 21 and more specifically the crimping area of the external sheath 9 by way of the rear flange 24, the end fitting 10 includes thermal insulation means interposed respectively between the front end flanges 12, and the rear end flanges 24 of the front part 11 and rear part 21.

As shown in FIG. 2, the thermal insulation means comprise of an annular block 35 made of insulating material and having an axial orifice 35a for the passage of the armour layer 4 and the corrugated tube 3.

The insulating material of which the annular block 35 is composed is preferably a composite comprising glass or ceramic or any other suitable material.

A material known as "Permaglas" and comprising an epoxy resin reinforced with a fibre glass mat is particularly suitable for the construction of the annular block 35. This material has in fact a low thermal conductivity of the order of 0.35 $Wm^{-1} \cdot K^{-1}$, making it possible to achieve a good degree of thermal insulation with a block of narrow thickness, typically of the order of 100 mm in thickness, which offers the advantage of reducing the length and cost of the connecting end fitting. Furthermore, this material does not become brittle at low temperatures and can withstand very high temperature gradients. In addition, it has high compression resistance, the compression breaking strength is of the order of 450 MPa, which, as will be explained further along, allows for its prestressing in compression in a manner such that it can withstand high bending loads.

Other materials might be suitable for constructing the annular block 35, in particular those having a thermal conductivity of less than 1 $W \cdot m^{-1} \cdot K^{-1}$, advantageously less than 0.5 $W \cdot m^{-1} \cdot K^{-1}$, as well as a compression breaking strength that is greater than 70 MPa, and preferably greater than 200 MPa. For example, some natural or reconstituted hardwoods could be used, subject to them being protected from sea water by means of a coating or suitable painting.

The connecting elements connecting this annular block 35 to the front end flange 12 and to the rear end flange 24 include front connecting elements formed by a cover 32 connecting the front end flange 12 to the annular block 35 and rear connecting elements formed by a cover 33 connecting the rear end flange 24 with the said annular block 35.

The front cover 32 and the rear cover 33 are connected to each other by tie rods 36 passing through the metal block 35 through annular bores 35b and distributed around the flexible pipe 1.

The metal tie rods 36 perform the function of transmitting mechanical forces through the annular block 35 without degrading the thermal insulation properties of the material of which the annular block 35 is composed.

These tie rods 36 thus ensure cohesion between the front 11 and rear 21 parts respectively, of the connecting end fitting 10. Preferably, the tie rods 36 are prestressed in tension in a manner so as to subject the composite material of the annular block 35 to compressive stresses and thus to prevent the latter from being subjected to tensile stresses when the connecting end fitting 10 is subjected to bending stress.

The bend restrictor 30 prevents the flexible pipe 1 from being subjected to extremely large bending radii at the level of the connecting end fitting 10 and the stresses generated by the bending of the pipe 1 are transmitted directly to the tie rods 36 by means of the rear end flange 24 without affecting the annular block 35.

Indeed, insulating materials capable of withstanding very low temperatures and high thermal gradients generally present the drawback of not being able to effectively withstand tensile or shearing forces. However, some of these materials, including glass, ceramics and composites based on glass or ceramic, are highly resistant to compression, to the extent that it is possible and advantageous to ensure they are highly prestressed so as to make them suitable for effectively enduring tensile or bending loads.

According to the second embodiment shown in FIG. 3, the connecting end fitting 40 also includes a front part 41 and a rear part 51.

The front part 41 has a front end flange 42 connected to the free end 3a of the corrugated pipe 3 by a leak proof sealed weld bead 43.

The front part 41 also includes a metal ring 44 inserted over the free end 3a of the corrugated pipe 3 and this metal ring 44 is integrally secured to the front end flange 42.

In this embodiment, the armour layer 4 is formed by wound metal armouring, the free ends 4a of which are fixed on the external face of the metal ring 44 by welding. In close proximity to the metal ring 44, the armouring of the armour layer 4 are held by a clamping ring 45 inserted over said armour layer.

The rear part 51 includes at least one rear end flange for crimping the leak proof sealed external sheath 9 and the thermal insulation layers 6 and 8 as well as the leak proof sealed intermediate sheath 7.

Preferably, the rear part 51 includes a front narrow tubing 52 inserted over the thermal insulation layer 6 and a first flange 53 for holding in place the leak proof sealed intermediate sheath 7. The free end of this leak proof sealed intermediate sheath 7 is wedged between the narrow tubing 52 and the first flange 53 by means of a clamping cone 54.

The rear part 51 also includes a second flange 55 having a front end 55a interposed between the end of the leak proof sealed intermediate sheath 7 and the first flange 53 so as to lock the clamping cone 54. The end of the leak proof sealed external sheath 9 is held by the second flange 55 by means of a narrow tubing 56 inserted over the leak proof sealed intermediate sheath 7. The free end of the leak proof sealed external sheath 9 is held between the second flange 55 and the narrow tubing 56 by a clamping cone 57. The clamping cone 57 is clamped between the leak proof sealed external sheath 9 and the second flange 55 by a third flange 58.

In order to prevent the cold front part 41 from cooling the rear part 51 and more specifically the crimping area of 9 the leak proof sealed external sheath by means of the flanges 55 and 58 given that the thermal insulation layers 6 and 8 are terminated before the front part 41, the connecting end fitting 40 includes thermal insulation means interposed between the front end flanges 42 and the rear flanges 53, 55 and 58.

These thermal insulation means comprise of an annular block 65 made of insulating material having an axial orifice 65a for the passage of the armour layer 4 and the corrugated tube 3.

The insulating material of which the annular block 65 is composed is advantageously a composite comprising glass or ceramic or any other suitable material. The material of this annular block 65 is identical to the material of the block 35.

The connecting elements connecting this annular block 65 to the front end flange 42 and the rear flanges 53, 55 and 58 includes a front connecting element that consists of a cover 61 connecting the front end flange 42 with the said annular block 65 by the screw members 59 connecting the first flange 53 and second flange 55 and by the screw members 60 connecting the second flange 55 and the third flange 58.

The front cover 61 and the first flange 53 are connected to each other by metal tie rods 66 passing through the annular block 65 through bores 65b distributed around the flexible pipe 1.

The metal tie rods 66 perform the function of transmitting mechanical forces through the annular block 65 without causing too much degradation of the thermal insulation properties of the annular block 65. These metal tie rods 66 thus ensure cohesion between the between the front 41 and rear 51 parts, respectively. Preferably, these tie rods 66 are prestressed in tension in a manner so as to subject the composite material of the said annular block 65 to compressive stresses in order to prevent the latter from being subjected to tensile stresses when the connecting end fitting 40 is subjected to bending stress.

In this embodiment also, the stresses generated by the bend restrictor, not shown, during the bending of the flexible pipe 1 are transmitted directly to the rods 66 without affecting the annular block 65.

In both the embodiments, the thermal insulation layers of the flexible pipe extend below the crimping area of the leak proof sealed external sheath until they come into contact with the insulating annular block.

Thus in this way, the crimping area of the leak proof sealed external sheath is protected from the cold that could come either directly from the flexible pipe, or indirectly from the front part of the connecting end fitting.

This thermal protection prevents the end of the leak proof sealed external sheath from being subjected to temperatures that are too cold and could cause weakening of the end of the leak proof sealed external sheath.

What is claimed is:

1. A flexible pipe arrangement for transporting a cryogenic fluid comprising:
    a flexible pipe comprising an end fitting, the flexible pipe including a corrugated inner tube that provides leak proof sealing for the cryogenic fluid, at least one tensile armour layer configured to withstand axial loads applied to the pipe, arranged around the corrugated tube, at least one thermal insulation layer, arranged around the armour layer, and a leak proof sealed external sheath disposed around the thermal insulation layer, the said end fitting including a front part comprising a front end flange for holding in place the corrugated tube and elements for fastening the armour layer and a rear part comprising of at least one rear end flange for crimping the leak proof sealed external sheath and for holding in place the thermal insulation layer, the front end flanges and the rear end flanges, respectively being connected to each other by connecting elements, wherein thermal insulation means are interposed between the front end flanges and the rear end flanges, respectively, in order to isolate the rear part from the front part of the connecting end fitting, the thermal insulation means have a thermal conductivity less than 1 $W \cdot m^{-1} \cdot K^{-1}$, and the thermal insulation means comprise an annular block made of insulating material comprising an axial orifice for the passage of the armour layer and the corrugated tube;
    wherein the connecting elements comprise front connecting elements connecting the front end flange to the annular block and rear connecting elements connecting the said at least rear end flange to the annular block, the front connecting elements and rear connecting elements, respectively, being connected to each other by metal tie rods passing through through bores in said annular block and distributed around the flexible pipe, the tie rods being prestressed in tension;
    wherein the annular block has a compression breaking strength greater than 70 MPa, the external sheath is longitudinally entirely arranged behind the annular block made of insulating material, and the tie rods are prestressed in tension, in a manner so as to subject the material of the annular block to compressive stresses.

2. A flexible pipe arrangement according to claim 1, wherein the insulating material of the annular block is a composite material consisting of glass or ceramic.

3. A flexible pipe arrangement according to claim 1, wherein the end of said at least one thermal insulation layer extends below the rear end flange up to the annular block.

* * * * *